(12) United States Patent
Tamegai et al.

(10) Patent No.: US 7,994,737 B2
(45) Date of Patent: Aug. 9, 2011

(54) DRIVE CIRCUIT OF DC/DC CONVERTER, LIGHT EMITTING APPARATUS AND ELECTRONIC DEVICE USING THE SAME

(75) Inventors: Yoichi Tamegai, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 544 days.

(21) Appl. No.: 11/993,058

(22) PCT Filed: Jun. 13, 2006

(86) PCT No.: PCT/JP2006/311837
§ 371 (c)(1),
(2), (4) Date: Dec. 19, 2007

(87) PCT Pub. No.: WO2006/137291
PCT Pub. Date: Dec. 28, 2006

(65) Prior Publication Data
US 2010/0225250 A1    Sep. 9, 2010

(30) Foreign Application Priority Data
Jun. 23, 2005   (JP) ................................. 2005-183999

(51) Int. Cl.
*G05F 1/00* (2006.01)
(52) U.S. Cl. ............... 315/307; 315/177; 315/209 R; 315/308
(58) Field of Classification Search ........... 315/177, 315/209 R, 219, 224, 225, 291, 294, 297, 315/299, 300, 307, 308, 326
See application file for complete search history.

(56) References Cited

U.S. PATENT DOCUMENTS

| | | | |
|---|---|---|---|
| 6,518,733 B1 * | 2/2003 | Schenkel et al. | 320/166 |
| 7,224,204 B2 * | 5/2007 | Walter | 327/427 |

(Continued)

FOREIGN PATENT DOCUMENTS

JP    2002-315335 A    10/2002
(Continued)

OTHER PUBLICATIONS

International Search Report for International Application No. PCT/JP2006/311837 mailed Sep. 19, 2006.

(Continued)

*Primary Examiner* — Douglas W Owens
*Assistant Examiner* — Jianzi Chen
(74) *Attorney, Agent, or Firm* — Cantor Colburn LLP (57) ABSTRACT

A drive circuit controls the on/off state of a switching transistor of a DC/DC converter. A first resistor is provided on a path of current flowing through a primary coil of a transformer connected to the switching transistor, and one end of the first resistor is grounded. A second resistor is provided on a path of current flowing through a secondary coil of the transformer, and one end of the second resistor is grounded. A switching controller turns off the switching transistor when a first detection voltage exceeds a first threshold voltage and, turns on the switching transistor after lapse of predetermined delay time since a second detection voltage exceeds the second threshold voltage.

8 Claims, 4 Drawing Sheets

U.S. PATENT DOCUMENTS

| | | |
|---|---|---|
| 2003/0214251 A1 | 11/2003 | Ichikawa et al. |
| 2004/0246750 A1 | 12/2004 | Ichikawa et al. |
| 2005/0237032 A1* | 10/2005 | Tan et al. ............... 320/166 |

FOREIGN PATENT DOCUMENTS

| | | |
|---|---|---|
| JP | 2003-259641 A | 9/2003 |
| JP | 2004-71428 A | 3/2004 |
| JP | 2004-201474 A | 7/2004 |
| JP | 2004-364433 A | 12/2004 |
| JP | 2005-65498 A | 3/2005 |
| JP | 2005-73483 A | 3/2005 |
| JP | 2005-130602 A | 5/2005 |

OTHER PUBLICATIONS

Written Opinion of the International Searching Authority for PCT/JP2006-311837 filed Jun. 13, 2006.

Chinese Office Action for Chinese Patent Application No. 200680001141.9 issued Aug. 1, 2008 with English Translation.

Notification of Reason(s) for Refusal for Japanese Application No. 2005-183999 with English translation dispatched on Sep. 21, 2010.

* cited by examiner

DRIVE CIRCUIT OF DC/DC CONVERTER, LIGHT EMITTING APPARATUS AND ELECTRONIC DEVICE USING THE SAME

BACKGROUND OF THE INVENTION

1. Field of the Invention

The present invention relates to a switching power supply and, more particularly, to a driving method of a DC/DC converter.

2. Description of the Related Art

To generate a voltage higher than an input voltage, a step-up switching power supply is widely used in various electronic devices. Such a step-up switching power supply has a switching element and an inductor or transformer. By turning on/off the switching element in a time sharing manner, back electromotive force is generated in the inductor or transformer to boost the input voltage, and the boosted voltage is output.

In an insulating-type DC/DC converter, when a switching transistor is turned off, current flows through the primary side of a transformer, and energy is stored in the transformer. When the switching transistor is turned off, the energy stored in the transformer on the secondary side of the transformer is transferred as charge current via a rectifier diode to an output capacitor, so that an output voltage increases. When the energy stored in the transformer is transferred to the output capacitor, the current flowing through the rectifier diode becomes zero.

As one of isolated DC/DC converters, a self-exciting DC/DC converter is known which monitors the state on the primary side or secondary side of a transformer without using an oscillator, and controls turn-on/off of a switching transistor in accordance with the state (refer to, for example, Japanese Patent Application Laid-Open Nos. 2004-201474 and 2005-73483).

As a method of controlling a self-exciting DC/DC converter, a control method including monitoring the current flowing through the primary and secondary sides of the transformer, turning on a switching transistor at a timing when current flowing through the secondary side becomes zero, and turning off the switching transistor at a timing when current on the primary side reaches a predetermined level will be considered.

In the case of controlling the switching transistor by the control method described above, in a state where the switching transistor is off, energy stored in the transformer is transferred to an output capacitor. In this case, if the switching transistor is switched to the on state immediately when the current flowing through the secondary side drops to nearly zero, then the switching transistor is turned on again in a state where energy still remains in the transformer due to the influence of reverse recovery time of a rectifier diode and the like. It deteriorates the efficiency of the DC/DC converter.

SUMMARY OF THE INVENTION

The present invention has been achieved in consideration of such a problem and a general purpose thereof is to provide a DC/DC converter with improved efficiency by reliably releasing energy remained in a transformer and a drive circuit for the same.

An embodiment of the present invention relates to a drive circuit for controlling on/off state of a switching transistor of a DC/DC converter. The drive circuit includes: a first resistor provided on a path of current flowing through a primary coil of a transformer connected to the switching transistor and of which one end is grounded; a first voltage comparator for comparing a first detection voltage appearing at the other end of the first resistor with a predetermined first threshold voltage; a second resistor provided on a path of current flowing through a secondary coil of the transformer and of which one end is grounded; a level shifter for shifting a second detection voltage appearing at the other end of the second resistor in the positive direction; a second voltage comparator for comparing an output voltage of the level shifter with a predetermined second threshold voltage; and a switching controller for controlling on/off state of the switching transistor on the basis of outputs of the first and second voltage comparators. The switching controller turns off the switching transistor when the first detection voltage exceeds the first threshold voltage and, turns on the switching transistor after lapse of predetermined delay time since the output voltage of the level shifter exceeds the second threshold voltage.

According to the present embodiment, by comparing the voltage shifted in the positive direction by the level shifter with the second threshold voltage, it can be detected when the current flowing through the secondary coil of the transformer has dropped to about 0. Further, by switching the switching transistor to the on state after lapse of predetermined delay time since the current drops to about 0, the switching transistor can be prevented from turning on in a state where energy still remains in the transformer. Thus, the efficiency of the DC/DC converter can be improved.

The switching controller may include a delay circuit for delaying an output of the second voltage comparator and, on the basis of an output of the delay circuit, turn on the switching transistor.

By providing the delay circuit at a post stage of the second voltage comparator and adjusting the time constant of the delay circuit, delay time by which the efficiency of the DC/DC converter becomes the maximum can be realized.

The delay circuit may include: a transistor of which the base terminal is connected to output of the second voltage comparator and of which the emitter is grounded; a resistor provided between a collector terminal of the transistor and a power supply terminal; and a capacitor provided between the collector terminal of the transistor and a ground terminal.

By using a CR time constant circuit as the delay circuit and adjusting a resistance value and a capacitance value, the delay time can be set to an optimum value.

The switching controller may include: a latch circuit for latching an output of the second voltage comparator; and a delay circuit for delaying an output of the latch circuit, and turn on the switching transistor on the basis of an output of the delay circuit.

By latching an output of the second voltage comparator, in the case where current flowing through the secondary coil in the transformer, that is, the second detection voltage fluctuates, the time until the switching transistor is turned on can be prevented from fluctuating, so that the switching transistor can be reliably turned on after lapse of predetermined delay time since the output of the second voltage comparator was latched.

The delay circuit may include: a logic gate provided at a post stage of the latch circuit; and a capacitor provided between an input terminal of the logic gate and a ground terminal.

In this case, when the capacitor is charged or discharged according to an output of the latch circuit and a voltage appearing at the capacitor reaches the threshold voltage of the logic gate, the output level of the logic gate changes. As a result, delay time, from the output level of the latch circuit is changed until the output level of the logic gate changes, can be set according to the capacitance value of the capacitor.

The capacitor may be provided right behind the latch circuit or provided at a post stage thereof via another logic gate.

The first voltage comparator, the level shifter, the second voltage comparator, and the switching controller may be integrated. The integration includes the case where all of components of a circuit are formed on a semiconductor substrate and the case where main components of a circuit are integrated. A part of the components such as a resistor and a capacitor may be provided on the outside of the semiconductor substrate for adjusting a circuit constant. Further, the switching transistor may be integrally formed with the circuit elements.

Another embodiment of the present invention relates to a light emitting apparatus. The light emitting apparatus includes: a DC/DC converter output circuit including a switching transistor and whose boosting operation is controlled by turn-on/off of the switching transistor; a drive circuit for controlling turn-on/off of the switching transistor; and a light emitting element driven by an output voltage of the DC/DC converter output circuit.

According to the present embodiment, a voltage can be boosted with high efficiency by the DC/DC converter, so that the light emitting element can emit light efficiently.

Further another embodiment of the present invention relates to an electronic device. The electronic device includes: an image capturing unit; and the light emitting apparatus used as a flash device at the time of performing image capturing by the image capturing unit. The light emitting apparatus boosts a battery voltage to drive the light emitting element.

According to the present embodiment, the light emitting apparatus can make the light emitting element emit light efficiently, so that the life of the battery can be increased.

Arbitrary combinations of the components, and replacements of the components and expressions of the present invention among the methods, apparatuses, systems, and the like are also effective as embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The present invention will be described hereinbelow on the basis of preferred embodiments with reference to the drawings. The same reference numerals are designated to the same or equivalent components, members, and processes shown in the drawings and their description will not be repeated. The present embodiments do not limit the invention but are illustrative. All of features and combinations thereof described in the present embodiments are not always essential of the invention.

Figure 1:
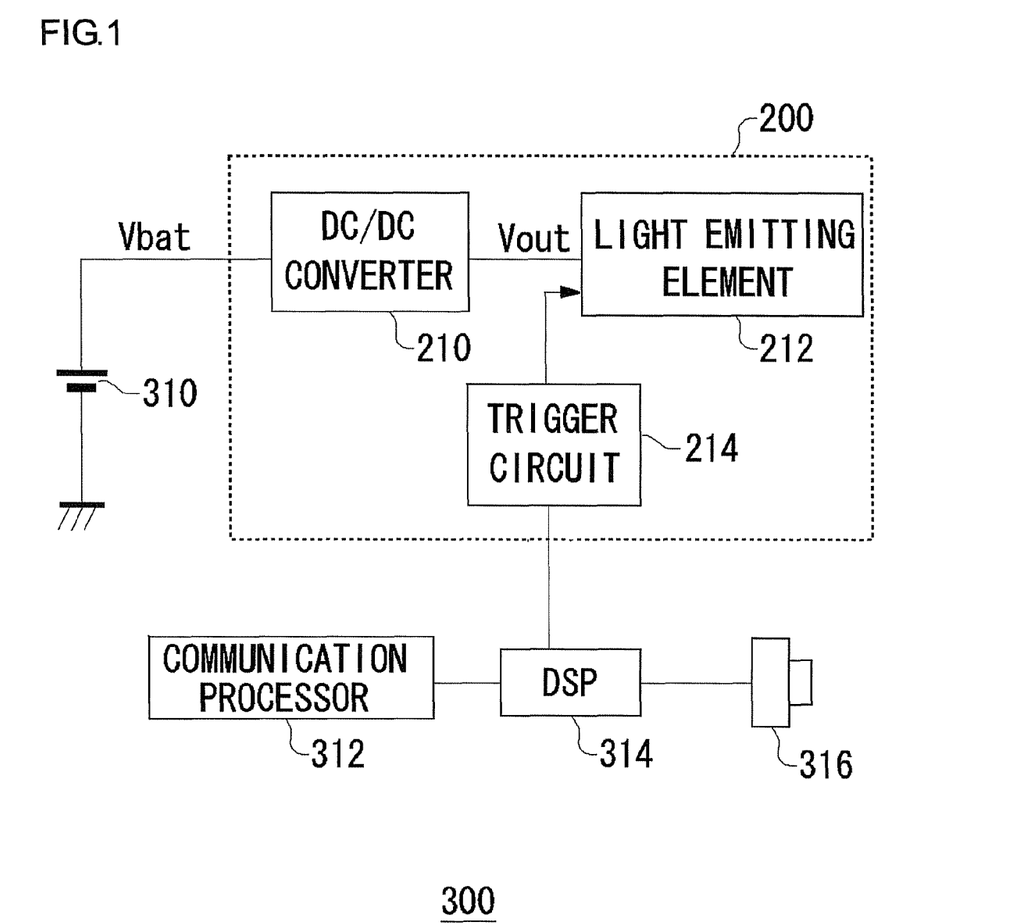
FIG. 1 is a block diagram showing the configuration of an electronic device equipped with a light emitting apparatus according to an embodiment.

FIG. 1 is a block diagram showing the configuration of an electronic device 300 equipped with a light emitting apparatus 200 according to the present embodiment. The electronic device 300 is a mobile phone terminal equipped with a camera and includes a battery 310, a communication processor 312, a DSP (Digital Signal Processor) 314, an image capturing unit 316, and the light emitting apparatus 200.

The battery 310 is, for example, a lithium ion battery and outputs a voltage of about 3V to 4V as a battery voltage Vbat. The DSP 314 is a block for controlling the whole electronic device 300 centrally and is connected to the communication processor 312, the image capturing unit 316, and the light emitting apparatus 200. The communication processor 312 is a block including an antenna, a high frequency circuit, and the like and for communicating with a base station. The image capturing unit 316 is an image capturing device such as a CCD (Charge Coupled Device) or a CMOS sensor. The light emitting apparatus 200 is a light source for light used as a flush at the time of image capturing performed by the image capturing unit 316.

The light emitting apparatus 200 includes a self-exciting DC/DC converter 210, a light emitting element 212, and a trigger circuit 214. As the light emitting element 212, a xenon tube or the like is preferably used. The self-exciting DC/DC converter 210 boosts the battery voltage Vbat supplied from the battery 310 and supplies a drive voltage of about 300V to the light emitting element 212. The trigger circuit 214 is a circuit for controlling light emission timings of the light emitting apparatus 200. The light emitting element 212 emits light synchronously with image capturing of the image capturing unit 316.

Figure 2:
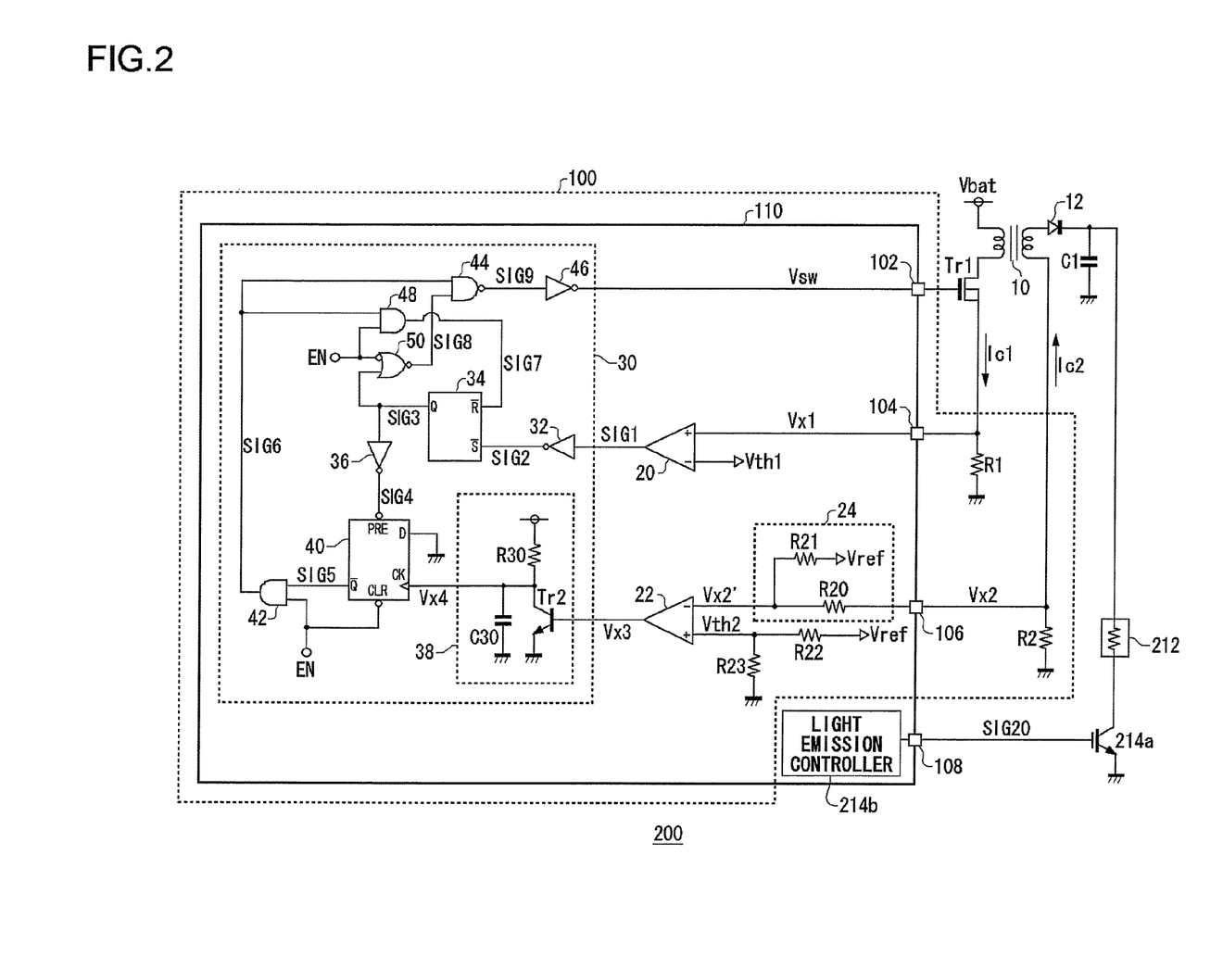
FIG. 2 is a circuit diagram showing the configuration of the light emitting apparatus according to the present embodiment.

FIG. 2 is a circuit diagram showing the configuration of the light emitting apparatus 200. The light emitting apparatus 200 includes a drive circuit 100, a switching transistor Tr1, a transformer 10, a rectifier diode 12, an output capacitor C1, the light emitting element 212, and an IGBT 214a.

The drive circuit 100, the switching transistor Tr1, the transformer 10, the rectifier diode 12, and the output capacitor C1 shown in FIG. 2 are equivalent to the self-exciting DC/DC converter 210 in FIG. 1. The trigger circuit 214 in FIG. 1 is equivalent to the IGBT 214a and a light emission controller 214b. In the present embodiment, the switching transistor Tr1, the transformer 10, the rectifier diode 12, and the output capacitor C1 mainly constitute a self-exciting DC/DC converter output circuit.

The drive circuit 100 controls the gate voltage of the switching transistor Tr1 of the self-exciting DC/DC converter 210 to control the on/off state. The battery voltage Vbat is applied to one end of a primary coil of the transformer 10, and a drain terminal of the switching transistor Tr1 is connected to the other end of the primary coil. The switching transistor Tr1 is an N-channel MOS transistor in which a first resistor R1 is connected between a source terminal and a ground terminal. A switching signal Vsw as an output signal of the drive circuit 100 is applied to the gate terminal of the switching transistor Tr1.

When the switching transistor Tr1 is turned on, current Ic1, which increases with time, flows through the primary coil of the transformer 10. The first resistor R1 is provided on the path of the current Ic1 that flows through the primary coil of the transformer 10 connected to the switching transistor Tr1, and one end of the first resistor R1 is grounded. A voltage appearing at the other end of the first resistor R1 is called a first detection voltage Vx1. The first detection voltage Vx1 is applied to a primary-side detection terminal 104 of a DC/DC converter drive IC 110. The first detection voltage Vx1 is given as Vx1=Ic1×R1.

To one end of a secondary coil of the transformer 10, an anode terminal of the rectifier diode 12 is connected. The output capacitor C1 is connected between the cathode terminal of the rectifier diode 12 and the ground terminal. A second resistor R2 is provided on the path of current that flows through the secondary coil. One end of the second resistor R2 is grounded, and the other end is connected to the secondary coil of the transformer 10. A voltage appearing at the other end of the second resistor R2 is called a second detection voltage Vx2, and the second detection voltage Vx2 is applied to a secondary-side detection terminal 106 of the DC/DC converter drive IC 110.

When the switching transistor Tr1 is turned off, energy stored in the transformer 10 is transferred to the output capacitor C1 via the rectifier diode 12. When it is assumed that current flowing through the secondary coil in the transformer 10 is Ic2, the second detection voltage Vx2 is given as Vx2=−Ic2×R2.

The DC/DC converter drive IC 110 is an integrated circuit integrated on a single semiconductor substrate. The DC/DC converter drive IC 110 includes circuit elements of the drive circuit 100 except for the first and second resistors R1 and R2 and, in addition, the light emission controller 214b. The DC/DC converter drive IC 110 has, as input/output terminals, an output terminal 102, the primary-side detection terminal 104, the secondary-side detection terminal 106, and a light emission control terminal 108.

The DC/DC converter drive IC 110 outputs the switching signal Vsw to be applied to the gate terminal of the switching transistor Tr1 from the output terminal 102. The primary-side detection terminal 104 and the secondary-side detection terminal 106 are terminals for detecting current flowing through the primary coil and the secondary coil of the transformer 10. The light emission control terminal 108 is a terminal for outputting a light emission control signal SIG20 for controlling light emission of the light emitting element 212.

The DC/DC converter drive IC 110 includes a first voltage comparator 20, a second voltage comparator 22, a level shifter 24, and a switching controller 30.

The first voltage comparator 20 compares the first detection voltage Vx1 input from the primary-side detection terminal 104 with a predetermined first threshold voltage Vth1, and outputs an output signal SIG1 which becomes the high level when Vx1>Vth1 and becomes the low level when Vx1<Vth1.

As described above, the first detection voltage Vx1 is proportional to the current Ic1 flowing through the primary coil of the transformer 10, so that the output signal SIG1 of the first voltage comparator 20 becomes the high level when the current Ic1 flowing through the primary coil reaches a first threshold current Ith1 given as Ith1=Vth1/R1.

The second voltage comparator 22 detects that the current Ic2 flowing through the secondary coil of the transformer 10 reaches a second threshold current Ith2. In the present embodiment, the value of the second threshold current Ith2 is set to be about 0 A.

The level shifter 24 includes resistors R20 and R21. The level shifter 24 shifts the second detection voltage Vx2 input from the secondary-side detection terminal 106 in the positive direction. The second detection voltage Vx2 to be input to the secondary-side detection terminal 106 is input to an inverting input terminal of the second voltage comparator 22 via the resistor R20. A reference voltage Vref is input to the inverting input terminal via the resistor R21. When the input impedance of the second voltage comparator 22 is sufficiently high and the relation of R20=R21 is satisfied, an output voltage Vx2' of the level shifter 24 is given as Vx2'=(Vx2+Vref)/2.

To the inverting input terminal of the second voltage comparator 22, a level-shifted second detection voltage Vx2' output from the level shifter 24 is input. To a non-inverting input terminal, a second threshold voltage Vth2 obtained by dividing the reference voltage Vref by resistors R22 and R23 is input. When R22=R23, the second threshold voltage Vth2 is given as Vth2=Vref/2. The second voltage comparator 22 compares the output voltage Vx2' of the level shifter 24 with the predetermined second threshold voltage Vth2. An output voltage Vx3 of the second voltage comparator 22 becomes the high level when Vx2'<Vth2, that is, when Vx2<0, and becomes the low level when Vx2'>Vth2, that is, when Vx2>0. In such a manner, the second threshold current Ith2 is set to 0 A.

The switching controller 30 controls the on/off state of the switching transistor Tr1 on the basis of outputs of the first voltage comparator 20 and the second voltage comparator 22.

When the first detection voltage Vx1 exceeds the first threshold voltage Vth1, that is, the current Ic1 flowing through the primary coil of the transformer 10 reaches the first threshold current Ith1, the switching controller 30 turns off the switching transistor Tr1.

The switching controller 30 turns on the switching transistor Tr1 after lapse of predetermined delay time after the second detection voltage Vx2' as an output of the level shifter 24 exceeds the second threshold voltage Vth2, that is, the current Ic2 flowing through the secondary coil of the transformer 10 reaches the second threshold current Ith2=0 A.

The output signal SIG1 of the first voltage comparator 20 is inverted by an inverter 32. An output signal SIG2 of the inverter 32 is input to a set terminal of an RS flip flop 34. An output signal SIG3 of the RS flip flop 34 is inverted by an inverter 36. An output signal SIG4 of the inverter 36 is input to a preset terminal of a D flip flop 40. The output signal SIG3 of the RS flip flop 34 is input to one of input terminals of a NOR gate 50. To the other input terminal of the NOR gate 50, an enable signal EN for controlling the on/off state of the whole self-exciting DC/DC converter 210 is input. When the enable signal EN is at the high level, the DC/DC converter drive IC 110 drives the switching transistor Tr1 to perform boosting operation. An output signal SIG8 of the NOR gate 50 is input to a NAND gate 44.

The switching controller 30 includes a delay circuit 38 for delaying the output voltage Vx3 of the second voltage comparator 22, and turns on the switching transistor Tr1 on the basis of an output of the delay circuit 38.

The delay circuit 38 includes a transistor Tr2 whose base terminal is connected to the output of the second voltage comparator 22 and whose emitter is grounded, a resistor R30 provided between the collector terminal of the transistor Tr2 and the power supply terminal, and a capacitor C30 provided between the collector terminal of the transistor Tr2 and the ground terminal. When the second detection voltage Vx2 reaches 0V, the output voltage Vx3 of the second voltage comparator 22 becomes the low level. At this time, the transistor Tr2 is turned off, and charging of the capacitor C30 starts via the resistor R30. A voltage Vx4 appearing at one end of the capacitor C30 increases in accordance with a CR time constant.

The voltage Vx4 appearing at one end of the capacitor C30 is input to a clock terminal of the D flip flop 40. The data terminal of the D flip flop 40 is grounded and fixed to the low level. The enable signal EN is input to a clear terminal of the D flip flop 40. By inputting the enable signal EN to the clear terminal, the DC/DC converter drive IC 110 can be initialized each time the boosting operation starts. To the preset terminal of the D flip flop 40, the output signal SIG4 of the inverter 36 is input.

When the output voltage Vx4 of the delay circuit 38 to be input to the clock terminal becomes the high level in a period in which a high-level signal is input to the preset terminal and the clear terminal, the D flip flop 40 outputs a high-level signal as an inverting output signal SIG5. When the output of the inverter 36 to be input to the preset terminal switches from the high level to the low level, the D flip flop 40 outputs a low-level signal as the inverting output signal SIG5.

The inverting output signal SIG5 of the D flip flop 40 is input to an AND gate 42. The AND gate 42 outputs the AND of the inverting output signal SIG5 of the D flip flop 40 and the enable signal EN to the NAND gate 44. The NAND gate 44 outputs the NAND of an output of the NOR gate 50 and an output of the AND gate 42 to an inverter 46. The inverter 46 inverts an output signal SIG9 of the NAND gate 44. The switching signal Vsw as an output of the inverter 46 is input to the gate terminal of the switching transistor Tr1 via the output terminal 102. To an AND gate 48, an output signal SIG6 of the AND gate 42 and the enable signal EN are input. An output signal SIG7 of the AND gate 48 is input to the reset terminal of the RS flip flop 34.

The light emission controller 214b generates the light emission control signal SIG20 to control the base voltage of the IGBT 214a.

Figure 3:
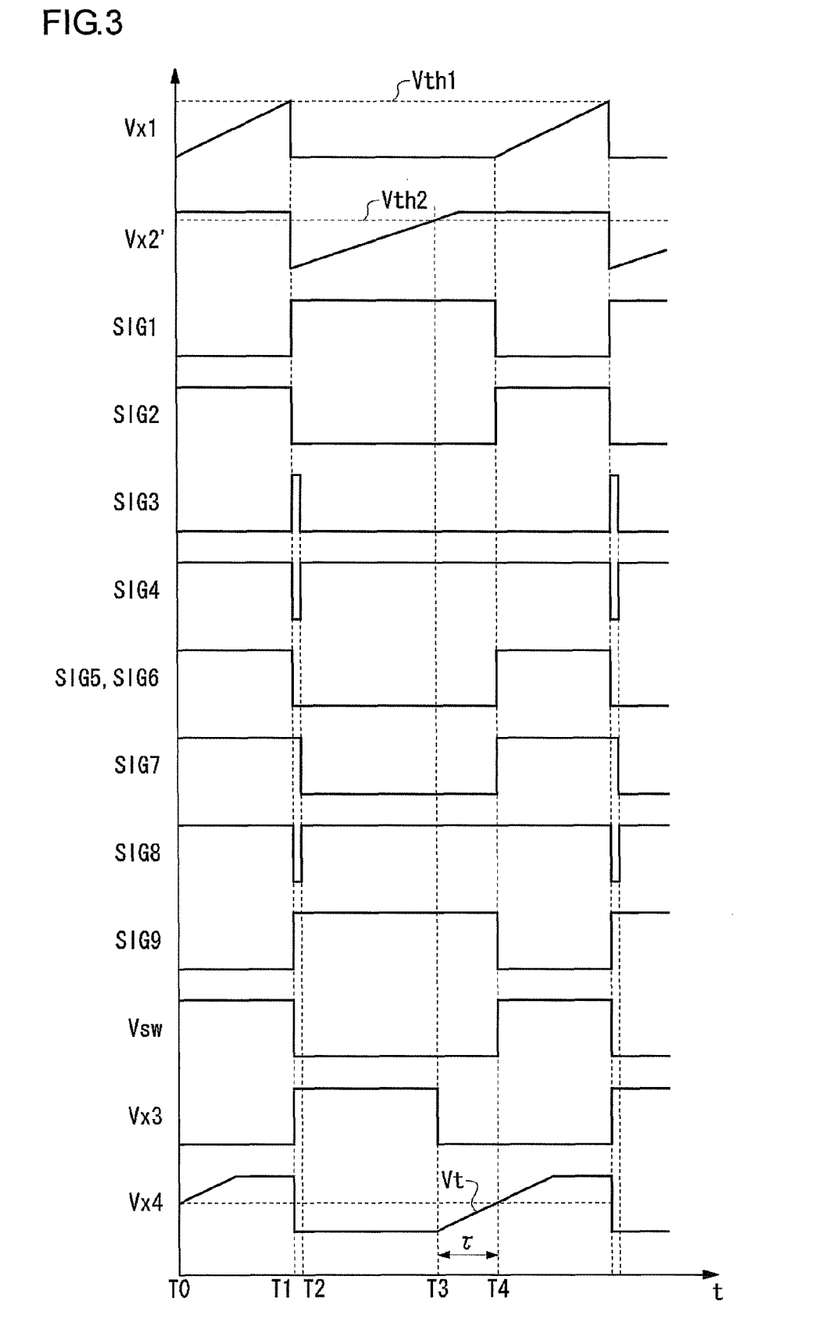
FIG. 3 is a time chart showing operations of a DC/DC converter drive IC in FIG. 2.

The operation of the light emitting apparatus 200 constructed as described above will be described. FIG. 3 is a time chart showing the operation of the DC/DC converter drive IC 110 of FIG. 2. The signals SIG1 to SIG9 correspond to signals shown in FIG. 2. It is assumed that the enable signal EN is set to the high level at time T0 or after that.

At time T0, the switching signal Vsw is at the high level and the switching transistor Tr1 is on. By turn-on of the switching transistor Tr1, the current Ic1 flowing through the primary coil of the transformer 10 gradually increases, and the relation of Vx1>Vth1 is satisfied at time T1.

When the relation Vx1>Vth1 is satisfied, the output SIG1 of the first voltage comparator 20 switches from the low level to the high level. Simultaneously, the output signal SIG2 of the inverter 32 switches from the high level to the low level. When the signal SIG2 switches from the high level to the low level, the RS flip flop 34 is set, and the output signal SIG3 of the RS flip flop 34 becomes the high level. When the signal SIG3 becomes the high level, the output signal SIG4 of the inverter 36 becomes the low level, the D flip flop 40 is preset, and the inverting output signal SIG5 of the D flip flop 40 becomes the low level. Since the enable signal EN is at the high level, the output signal SIG6 of the AND gate 42 has the same logic value as that of the signal SIG5.

When the enable signal EN is at the high level, the NOR gate 50 functions as an inverter for inverting the output signal SIG3 of the RS flip flop 34. Therefore, when the output signal SIG3 of the RS flip flop 34 becomes the high level at time T1, the output signal SIG8 of the NOR gate 50 changes from the high level to the low level. Since the two input signals SIG6 and SIG8 of the NAND gate 44 are at the low level at this time, the output signal SIG9 of the NAND gate 44 becomes the high level. As a result, at time T1, the switching signal Vsw output from the inverter 46 becomes the low level, and the switching transistor Tr1 is turned off.

When the output signal SIG6 of the AND gate 42 becomes the low level at time T1, at time T2 after lapse of delay time for a few gates, the output signal SIG7 of the AND gate 48 becomes the low level. When the output signal SIG7 of the AND gate 48 changes from the high level to the low level, the RS flip flop 34 is reset. As a result, the output signal SIG3 of the RS flip flop 34 is immediately reset to the low level. When the output signal SIG3 of the RS flip flop 34 becomes the low level, the output signal SIG8 of the NOR gate 50 becomes the high level. The output signal SIG4 of the inverter 36, that is, an input to the preset terminal of the D flip flop 40 also becomes the high level.

When the switching transistor Tr1 is turned off at time T1, the current Ic2 starts to flow through the secondary coil of the transformer 10. The current Ic2 becomes the maximum at the moment of turn-off of the switching transistor Tr1 and gradually decreases as the energy stored in the transformer 10 decreases. As a result, the second detection voltage Vx2 appearing in the second resistor R2 gradually increases with time. At this time, the output voltage Vx2' of the level shifter 24 also increases with time and reaches the second threshold voltage Vth2 at time T3, and the output voltage Vx3 of the second voltage comparator 22 switches from the high level to the low level.

When the output voltage Vx3 of the second voltage comparator 22 becomes the low level at time T3, the output voltage Vx4 of the delay circuit 38 starts to rise in accordance with a time constant. When the output voltage Vx4 of the delay circuit 38 input to the clock terminal of the D flip flop 40 reaches the threshold voltage Vt of the high level and the low level at time T4, which is after lapse of delay time τ from the time T3, the inverting output signal SIG5 of the D flip flop 40 becomes the high level. When the inverting output signal SIG5 of the D flip flop 40 becomes the high level, both of the output signal SIG6 of the AND gate 42 and the output signal SIG7 of the AND gate 48 become the high level. When the output signal SIG6 of the AND gate 42 becomes the high level, the output signal SIG9 of the NAND gate 44 becomes the low level, the output signal of the inverter 46, that is, the switching signal Vsw becomes the high level, and the switching transistor Tr1 is turned on again.

As described above, in the DC/DC converter drive IC 110 according to the present embodiment, the currents Ic1 and Ic2 flowing through the primary coil and the secondary coil of the transformer 10 are detected respectively, and the on/off state of the switching transistor Tr1 is switched. By switching the on/off state of the switching transistor Tr1, charges are accumulated in the output capacitor C1, and the output voltage Vout increases. When the output voltage Vout increases to a desired voltage value, the light emission controller 214b switches the light emission control signal SIG20 to the high level synchronously with image capturing of the image capturing unit 316 of FIG. 1. As a result, the IGBT 214a is turned on, and a xenon lamp as the light emitting element 212 emits light as flash light.

The DC/DC converter drive IC 110 according to the present embodiment turns on the switching transistor Tr1 at time T4 after lapse of predetermined delay time τ since the current Ic2 flowing through the secondary coil reached the second threshold current Ith2, which is set around 0 A, at T3. As a result, the switching transistor Tr1 can be prevented from being turned on again in a state where energy still remains in the transformer 10, so that the efficiency can be improved.

The delay time τ generated by the delay circuit 38 is desirably set to be equal to or longer than the reverse recovery time of the rectifier diode 12. The delay time τ may be determined by experiments so that the efficiency of the switching regulator becomes the maximum. The delay time τ can be set to a desired value by adjusting the values of the capacitor C30 and the resistor R30 of the delay circuit 38.

Figure 4:
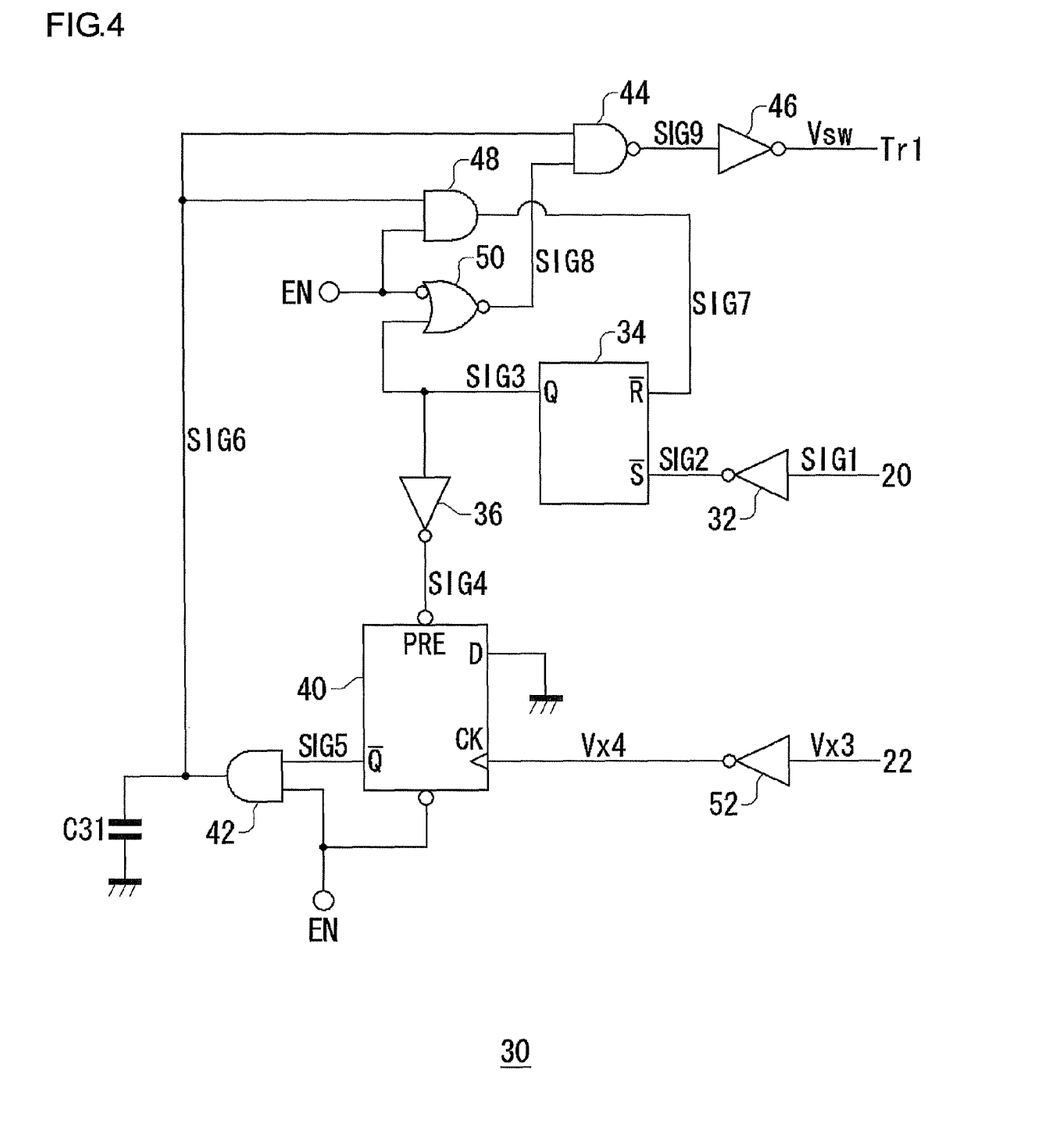
FIG. 4 is a circuit diagram showing a modification of a switching controller in FIG. 2.

FIG. 4 is a circuit diagram showing a modification of the switching controller 30. The switching controller 30 of FIG.

4 has, in place of the delay circuit 38 in FIG. 2, an inverter 52 for inverting the output voltage Vx3 of the second voltage comparator 22 and, further, has a capacitor C31 between the output terminal of the AND gate 42 and the ground terminal. In FIG. 4, the same reference numerals are designated to components which are the same or equivalent of those of FIG. 2, and their description will not be repeated appropriately.

In the switching controller 30 of FIG. 4, the output voltage Vx3 of the second voltage comparator 22 is inverted by the inverter 52 and the inverted output voltage is input to the clock terminal of the D flip flop 40. As a result, the current Ic2 flowing through the secondary coil of the transformer 10 reaches threshold current. At the moment when the output voltage Vx3 of the second voltage comparator 22 shifts from the high level to the low level, the inverting output signal SIG5 of the D flip flop 40 becomes the high level.

The inverting output signal SIG5 of the D flip flop 40 maintains its high level until the D flip flop 40 is preset again. In other words, the D flip flop 40 functions as a latch circuit for latching the output voltage Vx3 of the second voltage comparator 22.

When the inverting output signal SIG5 of the D flip flop 40 shifts from the low level to the high level, the output signal SIG6 of the AND gate 42 also shifts from the low level to the high level. At this time, the AND gate 42 charges the capacitor C31 to shift its output from the low level to the high level. As a result, the output signal SIG6 of the AND gate 42 rises with a time constant by the capacitor C31. After that, when the output signal SIG6 reaches the threshold voltage between the low level and the high level, the output signal SIG9 of the NAND gate 44 changes from the high level to the low level. As described above, delay occurs during a period since the output of the D flip flop 40 changes until an output of the NAND gate 44 changes. That is, the NAND gate 44 and the capacitor C31 form a delay circuit.

Depending on the number of turns or the coupling coefficient of the transformer 10, ringing may occur around OA in the current Ic2 flowing through the secondary coil of the transformer 10 in a state where the switching transistor Tr1 is off. In such a case, the output voltage Vx2' of the level shifter 24 fluctuates around the second threshold voltage Vth2. Consequently, the output voltage Vx3 of the second voltage comparator 22 shifts once from the high level to the low level and, after that, shifts again to the high level. It causes a problem such that the time necessary for the switching transistor Tr1 to turn on again increases.

In the switching controller 30 of FIG. 4, since the delay circuit constructed by the NAND gate 44 and the capacitor C31 is disposed at a post stage of the D flip flop 40, when the output voltage Vx3 of the second voltage comparator 22 shifts once from the high level to the low level, the state is latched by the D flip flop 40. By giving delay time to the inverting output signal SIG5 of the D flip flop 40, even in the case where ringing occurs in the current Ic2 flowing through the secondary coil of the transformer 10, the delay circuit can turn on the switching transistor Tr1 after lapse of the predetermined delay time.

It will be understood by a person skilled in the art that the foregoing embodiment is illustrative, and various modifications are possible with respect to the components and combinations of processes, and are within the scope of the present invention.

Although the case where the DC/DC converter drives the light emitting element 212 has been described above, the invention is not limited to the case but the DC/DC converter can drive various other load circuits requiring high voltage.

The setting of the logical values of the high and low levels in the present embodiment is an example. The logical values can be freely changed by appropriately inverting the value by an inverter or the like.

Although the present invention has been described on the basis of the present embodiment, obviously, the present embodiment just shows the principle and application of the invention and various modifications and changes in the layout are possible without departing from the gist of the present invention specified in the scope of claims.

The invention claimed is:

1. A drive circuit for controlling on/off state of a switching transistor of a DC/DC converter, comprising:
    a first resistor provided on a path of current flowing through a primary coil of a transformer connected to the switching transistor and of which one end is grounded;
    a first voltage comparator configured to compare a first detection voltage appearing at the other end of the first resistor with a predetermined first threshold voltage;
    a second resistor provided on a path of current flowing through a secondary coil of the transformer and of which one end is grounded;
    a level shifter configured to shift a second detection voltage appearing at a connection node between the second resistor and the secondary coil of the transformer in the positive direction;
    a second voltage comparator configured to compare the level-shifted second detection voltage shifted by the level shifter with a predetermined second threshold voltage; and
    a switching controller configured to turn off the switching transistor according to an output of the first voltage comparator and to turn on the switching transistor according to an output of the second voltage comparator;
    wherein the switching controller turns off the switching transistor when the first detection voltage exceeds the first threshold voltage and, turns on the switching transistor after lapse of predetermined delay time since the output voltage of the level shifter exceeds the second threshold voltage.

2. The drive circuit according to claim 1, wherein
    the switching controller includes a delay circuit for delaying an output of the second voltage comparator and, on the basis of an output of the delay circuit, turns on the switching transistor.

3. The drive circuit according to claim 2, wherein
    the delay circuit includes:
    a transistor of which the base terminal is connected to output of the second voltage comparator and of which the emitter is grounded;
    a resistor provided between a collector terminal of the transistor and a power supply terminal; and
    a capacitor provided between the collector terminal of the transistor and a ground terminal.

4. The drive circuit according to claim 1, wherein
    the switching controller includes:
    a latch circuit for latching an output of the second voltage comparator; and
    a delay circuit for delaying an output of the latch circuit, and
    the switching controller turns on the switching transistor on the basis of an output of the delay circuit.

5. The drive circuit according to claim 4, wherein the delay circuit includes:

a logic gate provided at a post stage of the latch circuit; and a capacitor provided between an input terminal of the logic gate and a ground terminal.

6. The drive circuit according to claim 1, wherein the first voltage comparator, the level shifter, the second voltage comparator, and the switching controller are integrated.

7. A light emitting apparatus comprising:

a DC/DC converter output circuit including a switching transistor and whose boosting operation is controlled by turn-on/off of the switching transistor;

a drive circuit configured to control turn-on/off of the switching transistor; and a light emitting element driven by an output voltage of the DC/DC converter output circuit, wherein the drive circuit includes:

a first resistor provided on a path of current flowing through a primary coil of a transformer connected to the switching transistor and of which one end is grounded;

a first voltage comparator configured to compare a first detection voltage appearing at the other end of the first resistor with a predetermined first threshold voltage;

a second resistor provided on a path of current flowing through a secondary coil of the transformer and of which one end is grounded;

a level shifter configured to shift a second detection voltage appearing at a connection node between the second resistor and the secondary coil of the transformer in the positive direction;

a second voltage comparator configured to compare the level-shifted second detection voltage shifted by the level shifter with a predetermined second threshold voltage; and a switching controller configured to turn off the switching transistor according to an output of the first voltage comparator and to turn on the switching transistor according to an output of the second voltage comparator;

wherein the switching controller turns off the switching transistor when the first detection voltage exceeds the first threshold voltage and, turns on the switching transistor after lapse of predetermined delay time since the output voltage of the level shifter exceeds the second threshold voltage.

8. A battery-operated electronic device comprising:

an image capturing unit; and the light emitting apparatus according to claim 7 used as a flash device at the time of performing image capturing by the image capturing unit, wherein the light emitting apparatus boosts a battery voltage to drive the light emitting element.

* * * * *